United States Patent [19]
Hattori et al.

[11] Patent Number: 5,422,717
[45] Date of Patent: Jun. 6, 1995

[54] METHOD AND APPARATUS FOR ANALYZING A LIGHTING ENVIRONMENT

[75] Inventors: Yoshihiro Hattori, Osaka; Sachio Nagamitsu, Kyoto; Hisashi Kodama, Ikoma, all of Japan

[73] Assignee: Matsushita Electric Industrial Co., Ltd., Osaka, Japan

[21] Appl. No.: 227,331

[22] Filed: Apr. 14, 1994

Related U.S. Application Data

[63] Continuation-in-part of Ser. No. 933,929, Aug. 24, 1992, abandoned.

[30] Foreign Application Priority Data

Aug. 22, 1991 [JP] Japan .................................. 3-210709
Jan. 31, 1992 [JP] Japan .................................. 4-15816
Oct. 1, 1992 [JP] Japan .................................. 3-253539

[51] Int. Cl.⁶ .............................................. G01T 1/42
[52] U.S. Cl. .................................................. 356/221
[58] Field of Search ............... 356/213, 216, 218, 225, 356/221, 226, 229, 230; 354/31, 32, 42, 33

[56] References Cited

FOREIGN PATENT DOCUMENTS

| | | |
|---|---|---|
| 0532940A2 | 3/1993 | European Pat. Off. . |
| 5-54703 | 4/1993 | Japan . |
| 5-94539 | 4/1993 | Japan . |
| 1356251 | 6/1974 | United Kingdom ................ 356/221 |

*Primary Examiner*—Hoa Q. Pham
*Attorney, Agent, or Firm*—Wenderoth, Lind & Ponack

[57] ABSTRACT

In a method of analyzing a lighting environment, the lighting environment is initially divided into a plurality of blocks so that all surfaces defining said lighting environment may be divided into a plurality of surface patches. The surface patch that radiates the most light energy is then searched. If the quantity of light radiated from this surface patch exceeds a given value, the quantity of light radiated from this surface patch which arrives at each of said plurality of surface patches is computed. Thereafter, the surface patch that radiates the next most light energy is searched, and the quantity of light radiated from this surface patch which arrives at each surface patch is computed. In this way, the total quantity of light received by each surface patch is obtained. In this method, mirror reflection is taken into account.

8 Claims, 16 Drawing Sheets

METHOD AND APPARATUS FOR ANALYZING A LIGHTING ENVIRONMENT

This application is a Continuation-In-Part application of application Ser. No. 07/933,929, filed Aug. 24, 1992 now abandoned.

BACKGROUND OF THE INVENTION

1. Field of the Invention

The present invention relates to a method of analyzing a lighting environment for use in simulating lighting or the like in a certain room by the use of a computer, and also to an analyzer for effecting this method.

2. Description of the Prior Art

In installing lighting fixtures in a room, it is desired to quantitatively analyze a lighting environment, prior to the installation, by computing the illuminance, luminance or the like at various locations in the room. In applications where such an analysis is performed, reflected light from walls as well as direct light from light sources should be taken into consideration.

Conventionally, a computation wherein the reflected light is taken into consideration is carried out with the use of a radiosity algorithm (see "A Progressive Refinement Approach to Fast Radiosity Image Generation" Michael F. Cohen etal., Computer Graphics, Vol. 22, No. 4, Aug. 1988 (SIGGRAPH '88 Conference Proceeding), pp. 75–84).

In this algorithm, ceilings, side walls, floors and any other structural elements constituting a room are initially divided into a large number of surface areas or patches. As a matter of course, an illuminating light source is contained in at least one of the surface areas or patches.

In view of this fact, of the patches, attention should first be paid to those patches radiating the most light energy, i.e., those patches containing illuminating light sources. Light is radiated from these patches in all directions. In determining the rate of light radiated from one patch which arrives at other patches, form-factors are initially computed based on the angle of radiation, the size of the patches and the like. A method of computing the form-factors is based on the number of lines emitted from one point (on the patch containing an illuminating light source) which arrive at other patches.

FIG. 1 is a flowchart indicating the procedure for computing the form-factors.

The angle of radiation of a light ray is computed at step S1. The luminous intensity of the light ray radiated at the computed angle is computed at step S2. The patch at which the light ray arrives is searched at step S3 based on the angle of radiation. The luminous intensity on the patch is computed at step S4 (the resultant value is cumulatively added). Step S5 determines as to whether computations have been terminated with respect to all lines emitted from said one point. If some lines remain to which computations have not been performed yet, the procedure returns to step S1 to compute the luminous intensity of light rays passing through those lines. If the radiation of light rays is terminated at all angles, the quantity of light radiated from said one point which arrives at each patch is computed at step S6.

Subsequently, of all the patches except the patch containing a light source, a patch having a largest luminous intensity is searched. This patch is regarded as a new light source and as a complete diffusing surface. Then, light is radiated from this patch in all directions, thereby gradually increasing the luminous intensity of each patch. In this way, the quantity of all light rays received by each patch is computed with accuracy.

For the above computations, a computer simulation is generally available wherein the illuminance of walls, floors, ceilings, furnitures, household stuffs, and other objects is computed by tracing not only direct light rays from an illuminator and natural lighting but also light rays reflected several times by these structural elements. The above-mentioned computer simulation is capable of not only performing a simulation by the input of a variety of conditions, but also comparing simulation results by varying the input conditions. Because of this, the computer simulation can reduce the time required for computations with a higher accuracy, and is, therefore, very effective when it is extensively put to practical use.

With reference to FIGS. 2 to 4, an exemplified conventional method and apparatus for analyzing a light environment is hereinafter discussed wherein a computer simulation is employed.

FIG. 3 is a flowchart indicating the procedure of the conventional method.

Step S11 is a tracing block and mesh coordinate input process wherein the entire internal space defined in a room or lighting environmental space to be analyzed are initially divided into a plurality of tracing blocks or hemi-cubes so that a computer can readily trace trails of light rays reflecting in the room. In FIG. 2, reference numeral 20 denotes one of the tracing blocks. In this process, coordinates of all the X-Y, Y-Z, and Z-X planes are inputted into a tracing block and mesh coordinate input means 1 shown in FIG. 4. The X-Y, Y-Z, and Z-X planes finely divide the surface of all objects such as walls, floors, ceilings, furnitures, and any other household stuffs constituting the entire internal surface of the room into tracing meshes each having an arbitrary rectangular configuration. In FIG. 2, reference numerals 21 denote the tracing meshes. Then, the tracing blocks 20 and the tracing meshes 21 are stored in a memory means 2 shown in FIG. 4. Thereafter, the procedure proceeds to step S12.

Step S12 is a physical property input process wherein, for each tracing mesh 21 obtained at step S11, the physical properties associated with light reception and reflection of an object having the tracing mesh 21 are inputted into and stored in the memory means 2.

Step S13 is a maximum reflective surface searching process wherein a maximum reflective surface searching means 3 shown in FIG. 4 searches the tracing mesh 21 having the maximum quantity of reflected light from among all the tracing meshes 21 obtained at step S11. As a matter of course, the target mesh is a tracing mesh containing a light source at first or a tracing mesh of which the product of the total quantity of light received thereby and the reflectance thereof is maximum at the time light radiated from the light source is being reflected. After the search operation completes, the procedure proceeds to step S14.

Step S14 is a light ray radiation angle determining process wherein a light ray radiation angle determining means 4 shown in FIG. 4 determines the radiation angles of a plurality of light rays radiated from the tracing mesh 21 searched at step S13 according to the quantity of light thereof. When the tracing mesh 21 contains a light source, the radiation angles are determined based on the luminous intensity distribution standards wherein the luminous intensity differs according to the direction of radiation and wherein the luminous intensity is highest in the frontward direction and is gradually reduced as the direction of radiation departs from the frontward direction. On the other hand, when the tracing mesh 21 is a reflective surface, the radiation angles are determined so that light rays may be reflected uniformly in all directions.

Step S15 is a luminous intensity computing process wherein a luminous intensity computing means 5 shown in FIG. 4 computes the luminous intensity of radiated light according to the direction of radiation. When the tracing mesh 21 having the maximum quantity of reflected light contains the light source, the luminous intensity of radiated light is computed based on the luminous intensity distribution standards. When the tracing mesh 21 is the reflective surface, the luminous intensity of radiated light is computed so that the reflection angles may follow Lambert's cosine law.

Step S16 is a form-factor operation process for each tracing mesh 21 wherein, when a plurality of light rays having respective radiation angles obtained at step S14 and respective luminous intensities obtained at step S15 are-radiated from the tracing mesh 21 which has the maximum quantity of reflected light and has been searched at step S13, a form-factor operation means 6 shown in FIG. 4 searches a receiving tracing mesh 21 at which each light ray arrives successively through the tracing blocks 20 obtained at step S11 and computes the quantity of light received by the receiving tracing mesh 21. Also, the formfactor operation means 6 performs operations to obtain the ratio between the sum of the quantity of light received by each tracing mesh 21 and the total sum of the quantity of light received by all the tracing meshes 21. This ratio is the so-called form-factor for each tracing mesh 21.

Step S17 is a received light quantity operation process wherein a received light quantity operation means 7 shown in FIG. 4 performs operations to obtain the quantity of light received by each tracing mesh 21 based on the quantity of reflected light of the tracing mesh 21 having the maximum quantity of reflected light and the form factor of each tracing mesh 21 obtained at step S16.

Step S18 is an adding process wherein an adding means 8 shown in FIG. 4 cumulatively adds the quantity of light received by each tracing mesh 21 which has been obtained at step S17.

Step S19 is a reflected light quantity operation process wherein a reflected light quantity operation means 9 shown in FIG. 4 performs operations to obtain the quantity of reflected light of each tracing mesh 21 based on the cumulative quantity of light received thereby and the reflectance thereof.

Step S20 is a judging process wherein a comparing means 10 shown in FIG. 4 compares the total sum of the quantity of reflected light of all the tracing meshes 21 at that time with a predetermined quantity of light (normally about 5% of the total quantity of light radiated from the light source). When the total sum is not less than the predetermined quantity of light, the procedure returns to step S13. In contrast, when the former is less than the latter, the operations end.

In the above-mentioned conventional construction, all internal surfaces forming a lighting environmental space to be analyzed are divided into the tracing blocks 20 10 by a plurality of X-Y, Y-Z, and Z-X planes, and all surfaces of each of the aforementioned objects constituting the entire internal surface of the lighting environmental space are finely divided by additional X-Y, Y-Z, and Z-X planes into the tracing meshes 21 each having an arbitrary rectangular configuration, as shown in FIG. 2. By doing so, the computer can readily trace trails of light rays which are being reflected inside the room. In this construction, however, wall surfaces are initially divided into large tracing meshes and are further divided into small tracing meshes by the additional X-Y, Y-Z, and Z-X planes due to the presence of furnitures. Because of this, some tracing meshes of the wall surfaces take the form of relatively small tracing meshes 21 or flat tracing meshes 21 having a large aspect ratio under the influence of the configuration of the furnitures. However, it is not necessary to divide the wall surfaces into such small tracing meshes.

When the small tracing meshes 21 are used, operations required to obtain the trails of light rays, the quantity of reflected light, and the quantity of light received by each tracing mesh need a lot of time, thus resulting in lack of practicability.

In operations to obtain the quantity of reflected light of the flat tracing meshes 21 having a large aspect ratio, because the computer regards them as containing a point light source irrespective of the configuration thereof, the operation result is substantially the same as that of a case where tracing meshes 21 having an aspect ratio of one contain a light source, thereby causing errors.

In operations to obtain the quantity of light received by the flat tracing meshes 21 having a large aspect ratio, the computer is not free from errors. Accordingly, the presence of the flat tracing meshes 21 having a large aspect ratio enlarges the errors.

In addition, walls, ceilings, floors and any other structural elements constituting a room have all hitherto been regarded as complete diffusing surfaces.

Actually, however, some rooms are provided with a mirror or mirrors or other surfaces effecting mirror reflection. Also, there may be some surfaces effecting both diffusion reflection and mirror reflection.

There have been proposed no practical methods capable of accurately simulating a lighting environment, taking reflection into account.

SUMMARY OF THE INVENTION

The present invention has been developed to overcome the above-described disadvantages.

It is accordingly an object of the present invention to provide an improved method and apparatus of analyzing a lighting environment, which can reduce errors and requires only a short simulation time.

Another object of the present invention is to provide a method and apparatus of the above-described type wherein mirror reflection is taken into account.

In accomplishing the above and other objects, a method according to the present invention comprises the steps of:
 (a) dividing a lighting environment into a plurality of blocks, thereby dividing all surfaces defining the lighting environment into a plurality of surface patches;
 (b) searching a first surface patch radiating a most light energy;
 (c) determining as to whether a quantity of light radiated from the first surface patch exceeds a given value; and (d) computing the quantity of light radiated from the first surface patch which arrives at each of the plurality of surface patches.

The step (d) comprises the steps of:

(d1) computing an angle of radiation of a light ray radiated from the first surface patch;

(d2) computing a luminous intensity of the light ray associated with the angle of radiation;

(d3) searching a second surface patch at which the light ray arrives;

(d4) adding the luminous intensity of the light ray at the second surface patch;

(d5) determining as to whether the second surface patch is a mirror surface;

(d6) multiplying, if the second surface patch is a mirror surface, the luminous intensity obtained at step (d4) by a mirror surface reflectance;

(d7) deriving an angle of reflection from an angle of incidence of the light ray relative to the mirror surface; and (d8) determining as to whether the number of light rays radiated from the first surface patch exceeds a given number.

The method according to the present invention further comprises the steps of:

(e) adding the quantity of light which arrives at the second surface patch;

(f) multiplying the quantity of light obtained at step (e) by a diffuse reflectance of the second surface patch;

(g) clearing the quantity of light to be radiated from the first surface patch to zero; and (h) repeating the steps (b) to (f).

In the method according to the present invention, because mirror reflection is taken into account, illuminance or luminance in the lighting environment can be obtained with accuracy.

Preferably, the number of light rays radiated from the first surface patch is changed according to the quantity of light radiated therefrom.

By doing so, the time required for operations can be shortened without lowering the accuracy thereof.

Even in applications where one or more objects are provided in a lighting environment, a method according to the present invention can simulate lighting in the lighting environment by tracing trails of light rays from a light source and those of light rays reflected by various surfaces defining the lighting environment- In such cases, the method preferably comprises the steps of:

inputting into an operation means coordinates of a plurality of planes extending in three directions perpendicular to each other;

dividing an entire internal space defined in the lighting environment into a plurality of blocks by the plurality of planes, thereby finely dividing all surfaces constituting an entire internal surface of the lighting environment into a plurality of first meshes each having an arbitrary rectangular configuration;

combining and/or dividing small meshes and flat meshes among all the first meshes except those of the object to reform them into second meshes having an aspect ratio closer to one and greater dimensions;

performing operations to obtain a quantity of light received by each of the first and second meshes by making the operation means trace the trails of the light rays which pass through the blocks; and performing operations to obtain a quantity of reflected light of each of the first and second meshes in accordance with a quantity of light received thereby.

In another aspect of the present invention, an apparatus for analyzing a lighting environment comprises:

means for dividing a lighting environment into a plurality of blocks, thereby dividing all surfaces defining the lighting environment into a plurality of surface patches;

means for searching a first surface patch radiating a most light energy;

means for determining as to whether a quantity of light radiated from the first surface patch exceeds a given value;

means for computing the quantity of light radiated from the first surface patch which arrives at each of the plurality of surface patches; and means for computing a quantity of light which arrives at each of the surface patches.

Said means for computing the quantity of light comprises:

means for computing an angle of radiation of each of a plurality of light rays radiated from the first surface patch;

means for searching a second surface patch at which each light ray arrives;

means for determining as to whether the second surface patch is a mirror surface; and means for deriving an angle of reflection from an angle of incidence of a light ray reflected by the mirror surface.

Said means for searching the first surface patch also searches a surface patch at which the light ray reflected by the mirror surface arrives.

Preferably, the apparatus further comprises means for determining the number of light rays radiated from the first surface patch according to the quantity of light radiated therefrom.

The apparatus according to the present invention can analyzing a lighting environment accommodating one or more objects. The apparatus simulates lighting in the lighting environment by tracing trails of light rays from a light source and those of light rays reflected by various surfaces defining the lighting environment.

In this case, the apparatus comprises:

a computer means;

means for inputting into the computer means coordinates of a plurality of planes extending in three directions perpendicular to each other; and means for dividing an entire internal space defined in the lighting environment into a plurality of blocks by the plurality of planes, thereby finely dividing all surfaces constituting an entire internal surface of the lighting environment into a plurality of first meshes each having an arbitrary rectangular configuration.

The apparatus further comprises:

means for combining and/or dividing small meshes and flat meshes among all the first meshes except those of the object to reform the small meshes and the flat meshes into second meshes having an aspect ratio closer to one and greater dimensions;

means for performing operations to obtain a quantity of light received by each of the first and second meshes by making the computer means trace the trails of the light rays which pass through the blocks; and means for performing operations to obtain a quantity of reflected light of each of the first and second meshes in accordance with a quantity of light received thereby.

The apparatus having the above-described construction reforms small or flat meshes into meshes having an aspect ratio closer to one and greater dimensions, thereby reducing the number of meshes. As a result, not only the time required to perform a simulation is shortened but also errors, which may occur during operations, are reduced.

BRIEF DESCRIPTION OF THE DRAWINGS

The above and other objects and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENTS

Figure 17:
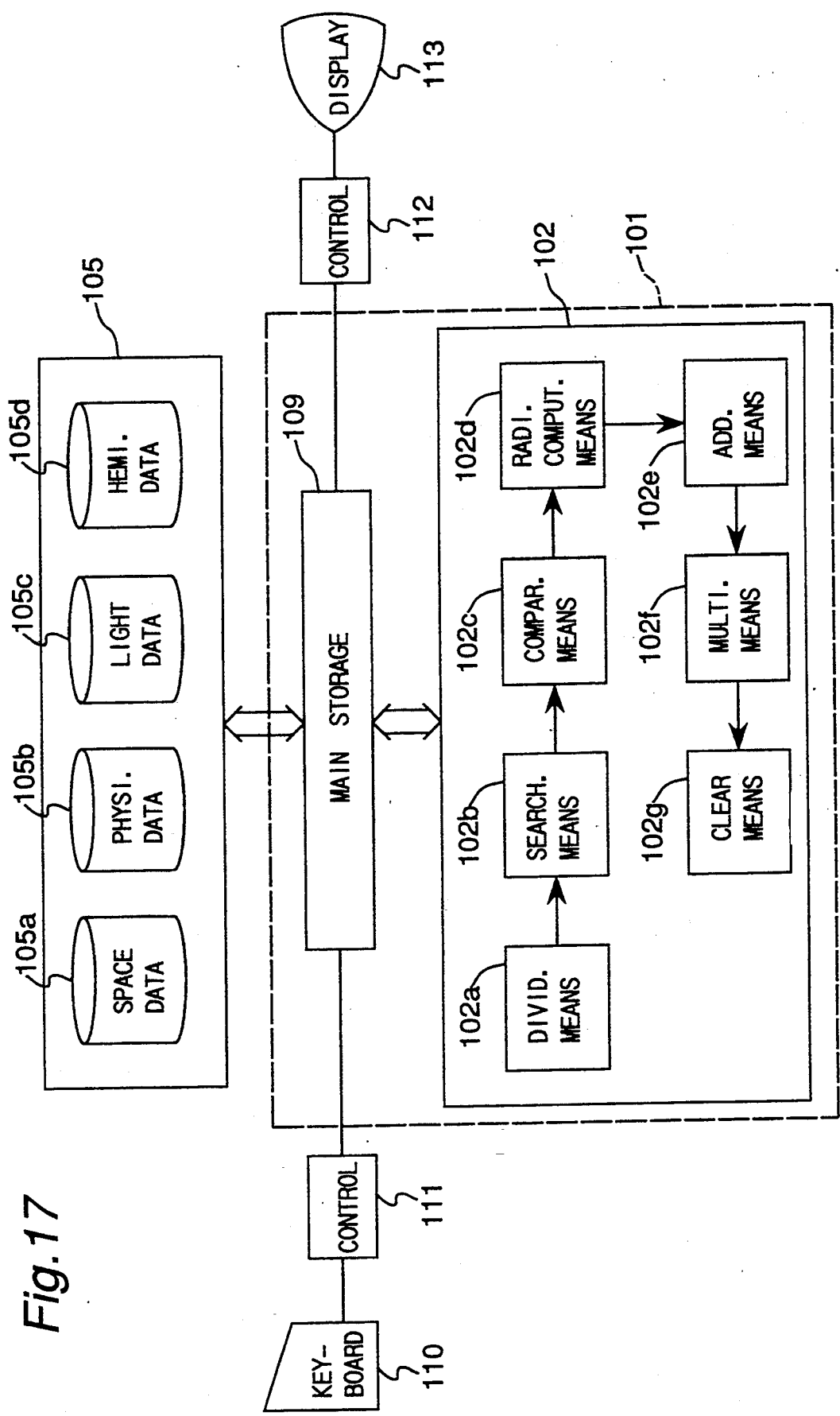
FIG. 17 is a block diagram of the apparatus according to the present invention.

Referring now to the drawings, there is shown in FIG. 17 an apparatus of the present invention for analyzing a three-dimensional space constituting a lighting environment.

The apparatus of FIG. 17 comprises a CPU 101, comprised of an operation unit 102 and a main storage 109, for executing various operations to analyze the lighting environment. This apparatus also comprises a keyboard 110 for inputting various data indicative of a lighting environment to be processed, a storage unit 105 for storing therein the data inputted from the keyboard 110 via an input controller 111 and the main storage 109. The storage unit 105 includes a space data storage portion 105a for storing space data indicative of the lighting environment to be processed, a physical data storage portion 105b for storing physical data of all surface areas or patches delimiting the lighting environment, and a light-source data storage portion 105c for storing the position, brightness, configuration and the like of light sources existing in the lighting environment. The lighting environment to be analyzed is displayed on a display 113 via a display controller 112.

Figure 5:
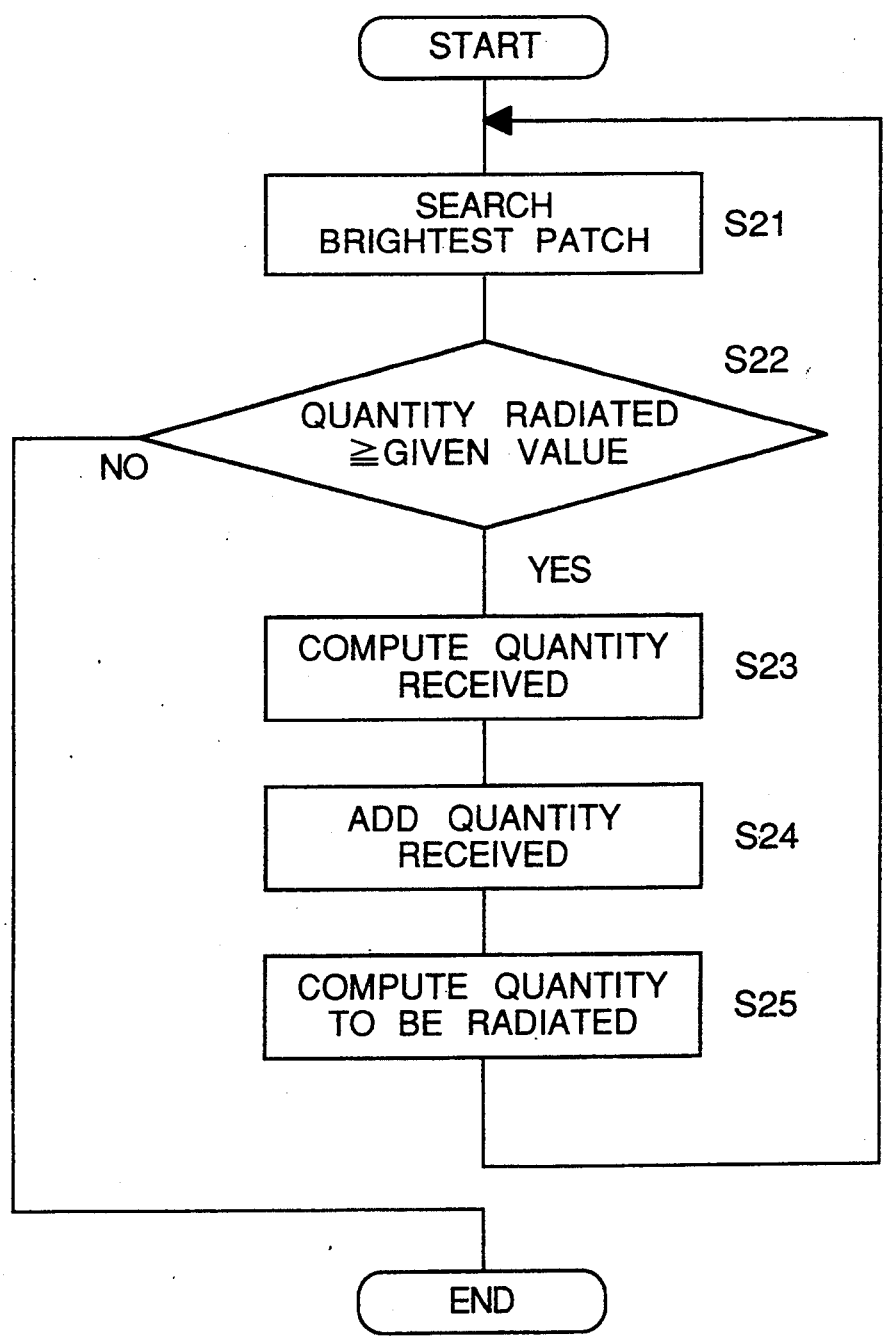
FIG. 5 is a flowchart indicating a method according to the present invention.
Figure 6:
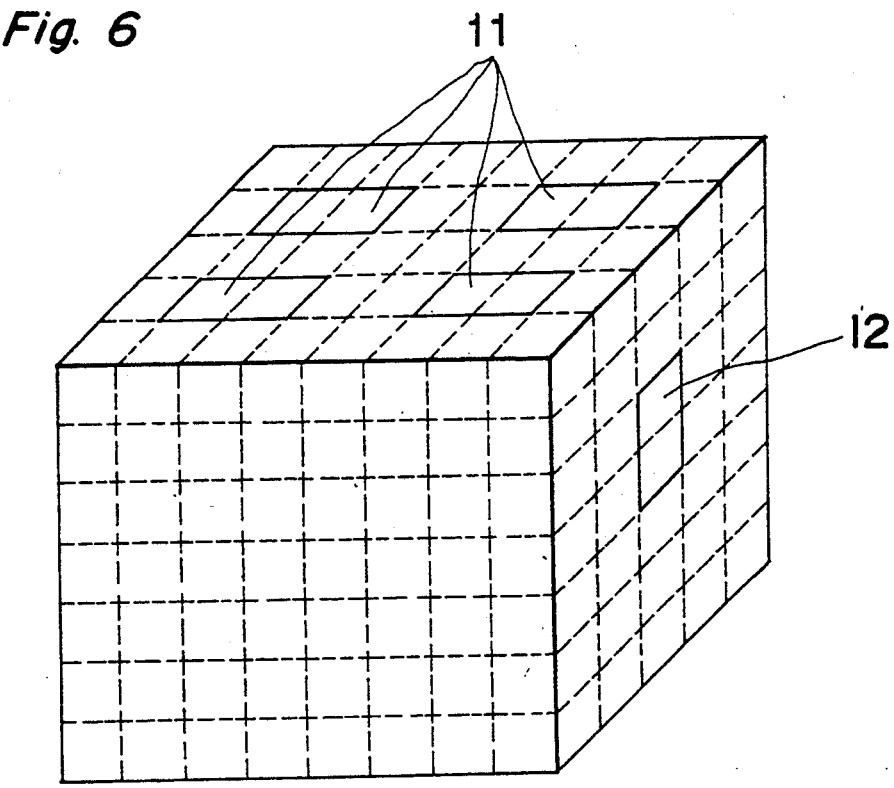
FIG. 6 is a schematic perspective view of a lighting environment to which the present invention is applied.

FIG. 5 depicts a flowchart indicating the processing to analyze a three-dimensional space as shown in FIG. 6. At step S21, the three-dimensional space constituting a lighting environment are initially divided into a number of tracing blocks by a plurality of planes. This processing is executed by a dividing means 102a. Of all surface areas or patches of the tracing blocks, one surface patch radiating the most light energy is searched by a maximum radiation searching means 102b. Light is radiated from this surface patch in all directions. First, one of those patches 11 containing an illuminating light source is selected. When there exist a plurality of illuminating light sources, the brightest light source is selected. In 10 FIG. 6, reference numeral 12 denotes a mirror surface.

A comparing means 102c determines, at step S22, as to whether the quantity of light radiated from the selected patch exceeds a given value stored in the main storage 109. The quantity of light radiated from the light source 11 which arrives at each patch is then computed by a radiation computing means 102d at step S23. At the next step S24, for each patch, the quantity of light which arrives at the patch is added by an adding means 102e. The quantity of light obtained by multiplying the resultant value by a diffuse reflectance is a quantity of light to be radiated from each patch, which is subsequently regarded as a light source. This quantity of light is computed by a multiplying means 102f at step S25. At this moment, each patch is regarded as a complete diffusing surface. The quantity of light to be radiated from the patch which has completed radiation is cleared to zero by a clearing means 102g. Thereafter, the procedure returns to step S21 to search the patch of which the quantity of light obtained at step S25 is greater than that of any other surface patches. All of the dividing means 102a, maximum radiation searching means 102b, comparing means 102c, radiation computing means 102d, adding means 102e, multiplying means 102f, and clearing means 102g referred to above are provided in the operation unit 102.

Figure 8:
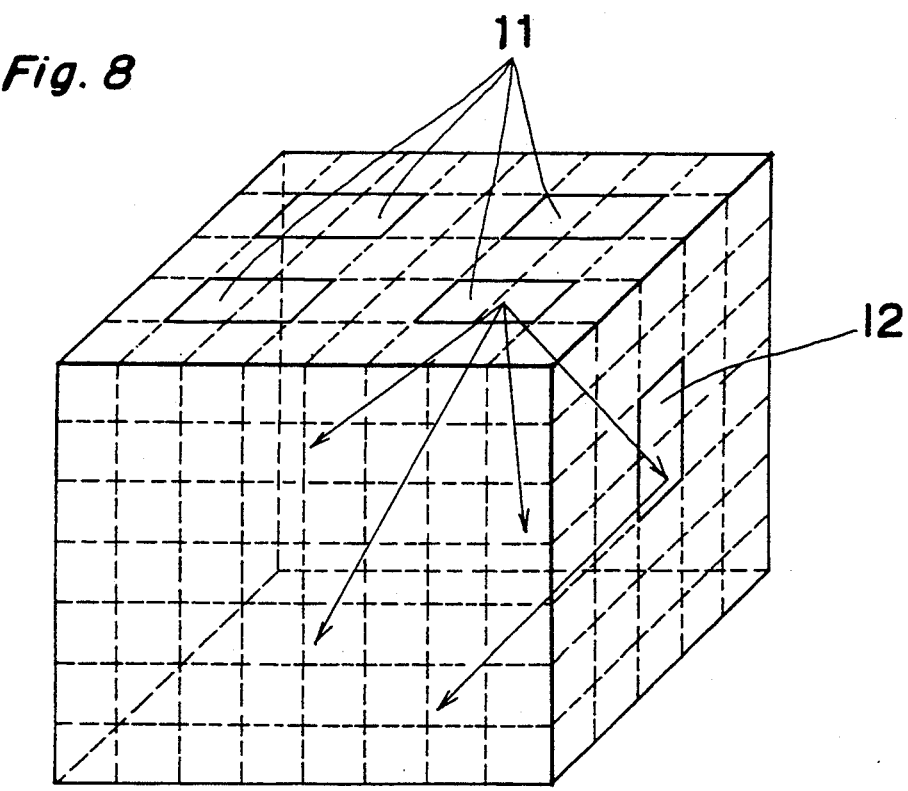
FIG. 8 is a view similar to FIG. 6, but particularly indicating the direction in which light rays radiated from a light source advance.
Figure 7:
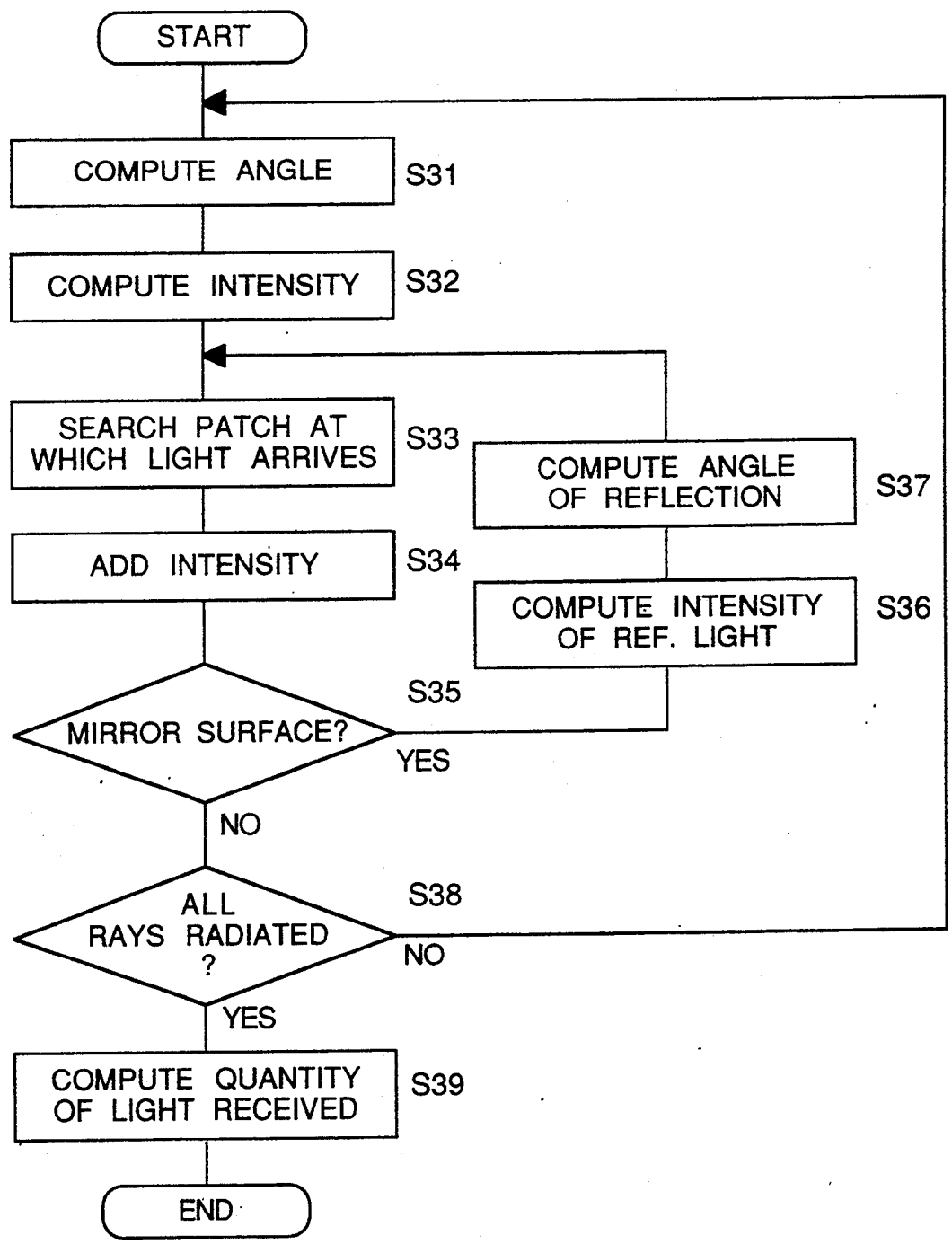
FIG. 7 is a flowchart indicating the detailed procedure for computing the quantity of light received by each of a plurality of surface patches.

FIG. 7 is a flowchart indicating details of operations executed at step S23 in the flowchart of FIG. 5. As shown in FIG. 8, light is radiated from a radiation surface in all directions, and the quantity of light which arrives at each patch is computed.

Figure 9:
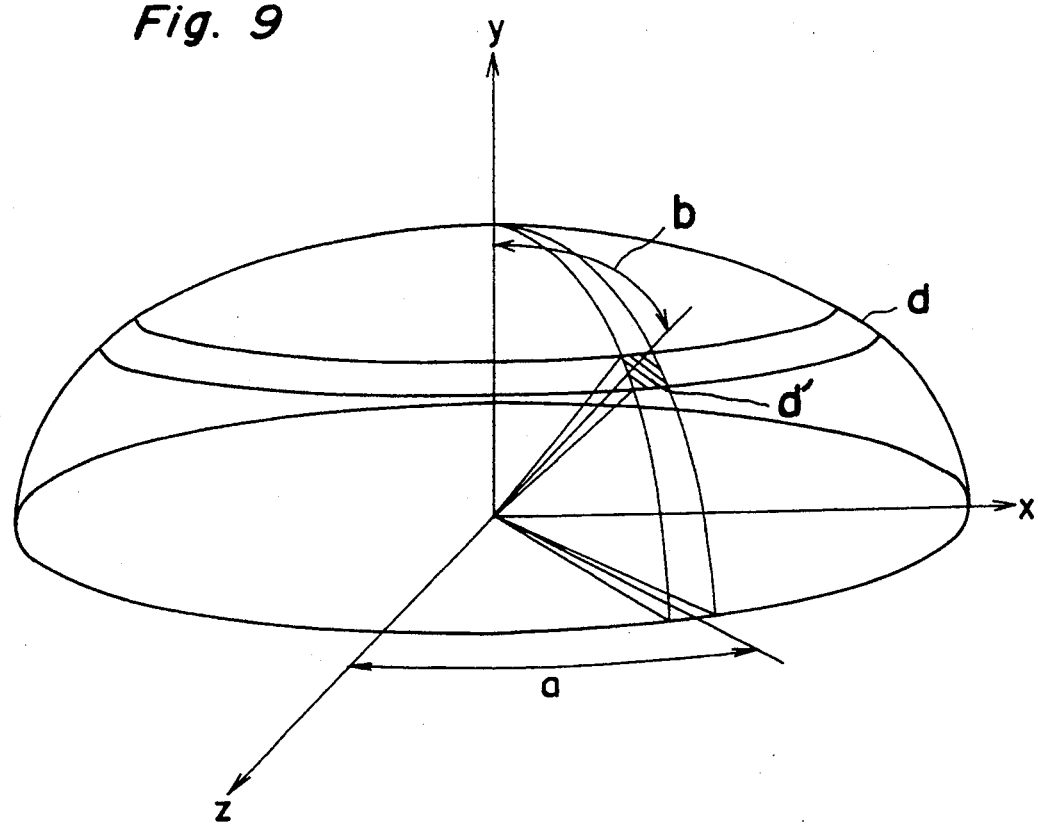
FIG. 9 is a perspective view of an imaginary hemisphere which is supposed to lie over the center of each surface patch.

In the flowchart of FIG. 7, the angle of radiation of a light ray is initially computed by a radiation-angle computing means $102d_1$ at step S31. The luminous intensity of the light ray radiated at the computed angle is computed by a luminous-intensity computing means $102d_2$ at step S32. In computing the angle of radiation and the luminous intensity of the light ray, an imaginary hemisphere is supposed to lie over the center of the patch, as shown in FIG. 9. This hemisphere is divided into a large number of trapezoids, the location of each of which is indicated by a zenithal angle (b) and a horizontal angle (a).

Figure 10:
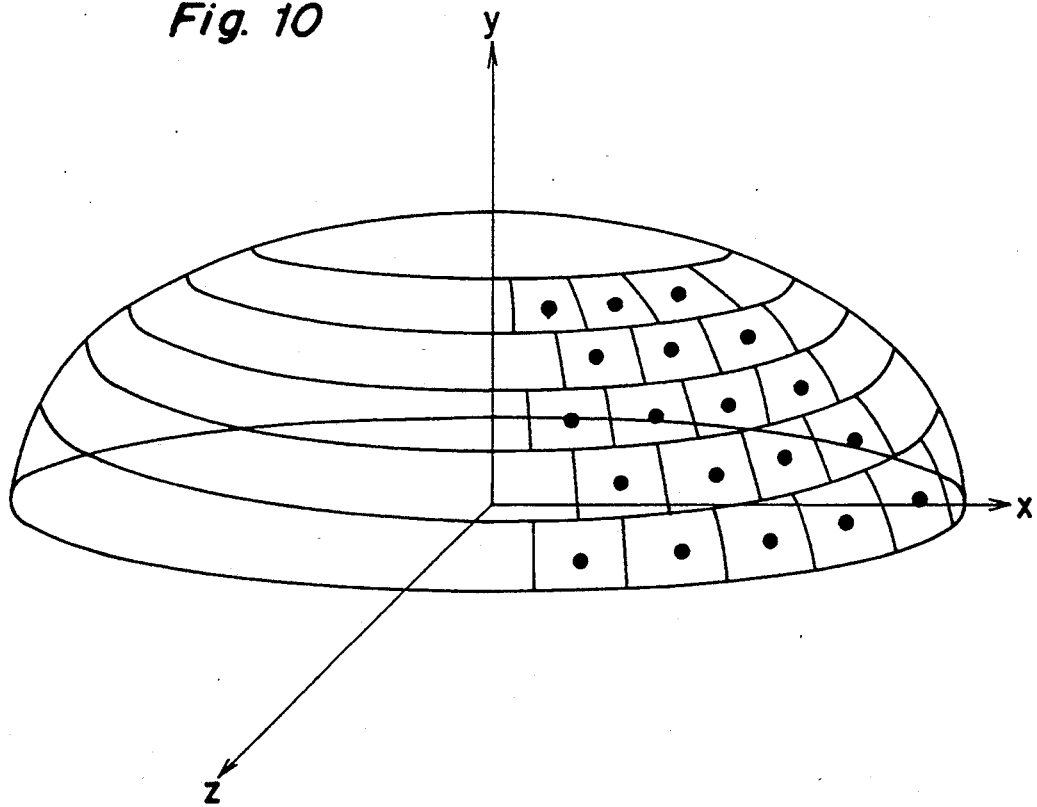
FIG. 10 is a perspective view of the hemisphere having a plurality of generally equally divided sections.

FIG. 10 depicts the hemisphere having a large number of substantially equally divided sections, each of which is close to a square. In other words, in FIG. 9, the length of (d) is nearly equal to that of (d'). It is supposed that a plurality of light rays are radiated from a light source in generally equally spaced different directions and pass through the centers of all the sections shown by black dots in FIG. 10. The angle of radiation and the luminous intensity of each light ray determined at steps S31 and S32 depend on the number of light rays radiated.

Figure 11:
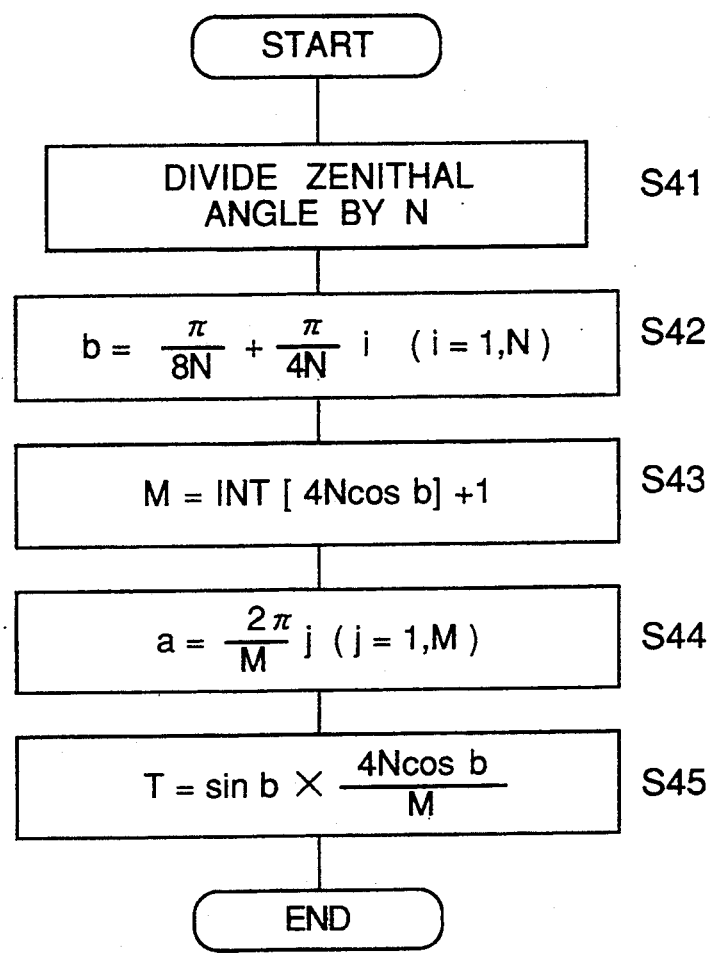
FIG. 11 is a flowchart indicating how to divide the hemisphere.

More specifically, the angle of radiation and the luminous intensity are computed in a manner such as shown in a flowchart of FIG. 11. In this flowchart, the number N into which the zenithal angle is divided is initially inputted, at step S41, into a hemispherical data storage portion $105d$ of the storage unit $105$ using the keyboard $110$. At step S42, the zenithal angle (b) shown in FIG. 9 is given by:

$$b = \frac{\pi}{8N} + \frac{\pi}{4N} i \quad (i = 1, N)$$

where i is an integer ranging from 1 to N. At step S43, the number M into which the horizontal angle is divided is given by:

$$M = INT[4N\cos b] + 1$$

Both the number M and the zenithal angle (b) are integers. At step S44, the horizontal angle (a) shown in FIG. 9 is given by:

$$a = \frac{2\pi}{M} j \quad (j = 1, M)$$

At step S45, the luminous intensity of light is given by:

$$T = \sin b \times \frac{4N\cos b}{M}$$

In consideration of Lambert's cosine law, the luminous intensity of light will attain a value reduced a quantity by which the dividend (the number of division) is rounded up to an integer so that the product of the luminous intensity of light and the area of each section may not be changed by the round-up. In this way, for each section, the zenithal angle, the horizontal angle, and the luminous intensity of a light ray to be radiated are determined. Also, the number of light rays to be radiated is determined. All the equations referred to above are contained in the hemispherical data storage portion $105d$ of the storage unit $105$.

Referring back to the flowchart of FIG. 7, the surface patch to which the light ray is radiated is searched by a surface patch searching means $102d_3$ at step S33 followed by step S34 at which the luminous intensity of the light ray which arrives at the surface patch is added by an adding means $102d_4$. A surface determining means $102d_5$ determines at step S35 whether the surface patch is a mirror surface 12. If the determination at step S35 is YES, the luminous intensity of a light ray which is reflected by the mirror surface 12 is obtained by multiplying the luminous intensity obtained at step S34 by a mirror surface reflectance at step S36. At step S37, the angle of reflection is derived from the angle of incidence. The processing of step S36 and that of step S37 are executed by a multiplying means $102d_6$ and a reflection angle computing means $102d_7$, respectively. Thereafter, the chase of the reflected light is repeated at steps S33–S35.

If the light ray arrives at a surface patch which causes no mirror surface reflection, the chase is terminated at step S35. Step S38 determines as to whether all the light rays are radiated from the aforementioned illuminating light source. To this end, a number-of-rays comparing means $102d_s$ compares the number of the light rays radiated from the illuminating light source with a given number stored in the main storage 109. If all the light rays are not radiated, the procedure returns to step S31 from which the chase of each of other light rays radiated at different angles is carried out.

If the radiation of all the light rays is terminated, the quantity of light which arrives at each patch is computed by a light quantity computing means $102d_9$ at step S39. The quantity of light to be received by the patch is given by E×G/F, where E denotes the quantity of light radiated from the radiation surface, F the total luminous intensity of the radiated light, and G the luminous intensity of the light received by the patch.

Figure 18:
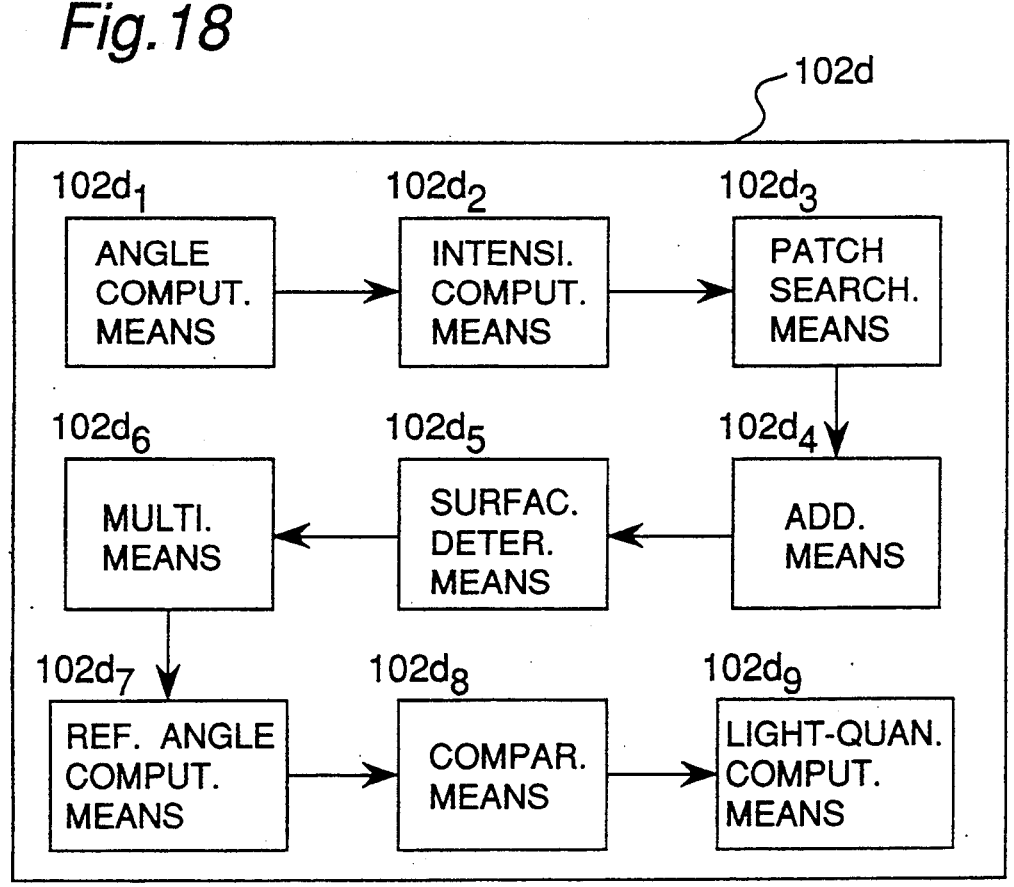
FIG. 18 is a block diagram of a radiation computing means of an operation unit provided in the apparatus of FIG. 17.

FIG. 18 depicts the construction of the radiation computing means $102d$ for executing the processings of steps S31 to S39 mentioned above.

Figure 12:
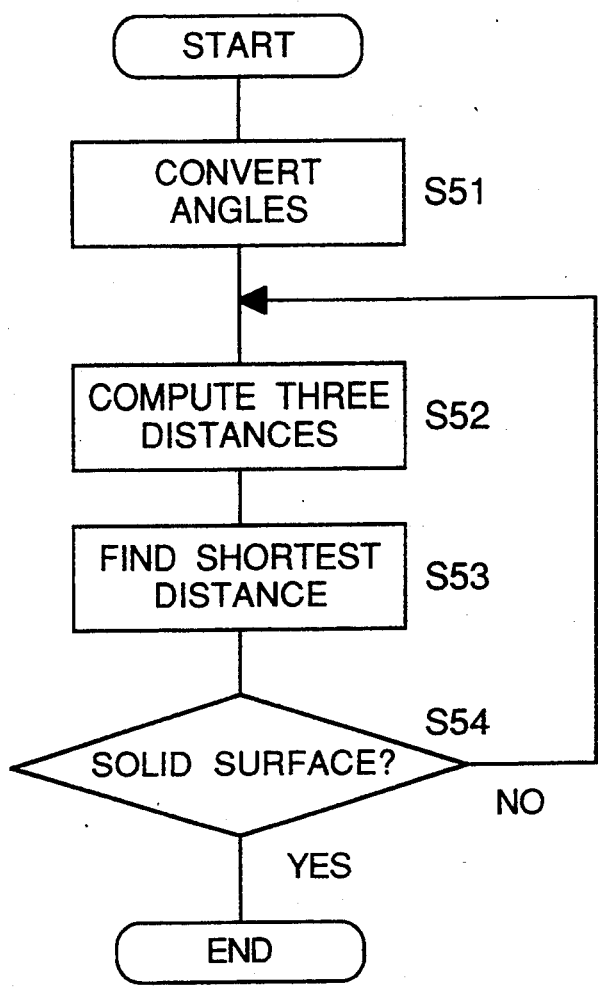
FIG. 12 is a flowchart indicating the procedure for finding the surface patch at which each light ray arrives.
Figure 19:
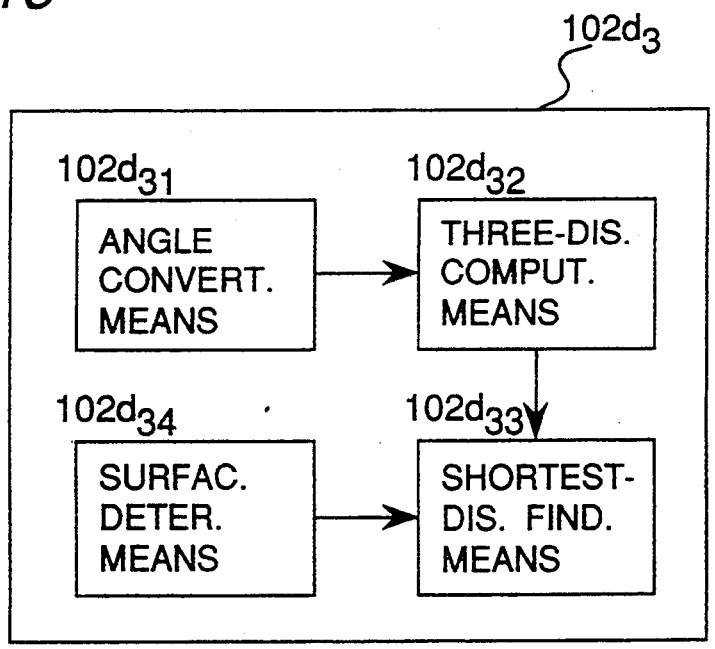
FIG. 19 is a block diagram of a surface patch searching means provided in the radiation computing means of FIG. 18.

FIG. 12 is a flowchart indicating a detailed search executed at step S33 in the flowchart of FIG. 7. The light ray radiated at the computed zenithal angle and the horizontal angle successively passes through one tracing block to the next. In view of this fact, at step S51, the zenithal angle and the horizontal angle shown in FIG. 9 are converted into three-directional components in a rectangular coordinate system. Whenever the light ray arrives at each tracing block, the distance between the point of incidence and the next tracing mesh is computed in each of the three directions at step S52. Of the three distances computed at step S52, the shortest distance is obtained at step S53. Step S54 determines as to whether the tracing mesh closest to the point of incidence is a solid surface. If this tracing mesh is the solid surface, the chase of light rays radiated therefrom at different angles can be readily performed by changing the coordinates thereof based on converted data. If the tracing mesh is a mirror surface, the angle of reflection can be obtained by changing the sign of one of the three-directional components. In this way, the surfaces at which each light ray arrives are searched. The processings of steps S51, S52, S53, and S54 are executed by an angle converting means $102d_{31}$, a three-distance computing means $102d_{32}$, a shortestdistance finding means 102$d_{33}$, and a surface determining means 102$d_{34}$, respectively, all of which are contained in the surface patch searching means 102$d_3$, as shown best in FIG. 19.

Referring back to the flowchart of FIG. 5, if it is determined at step S22 that the quantity of light radiated from the selected patch is greater than the given value, the steps S23–25, S21, and S22 are repeated.

Figure 13:
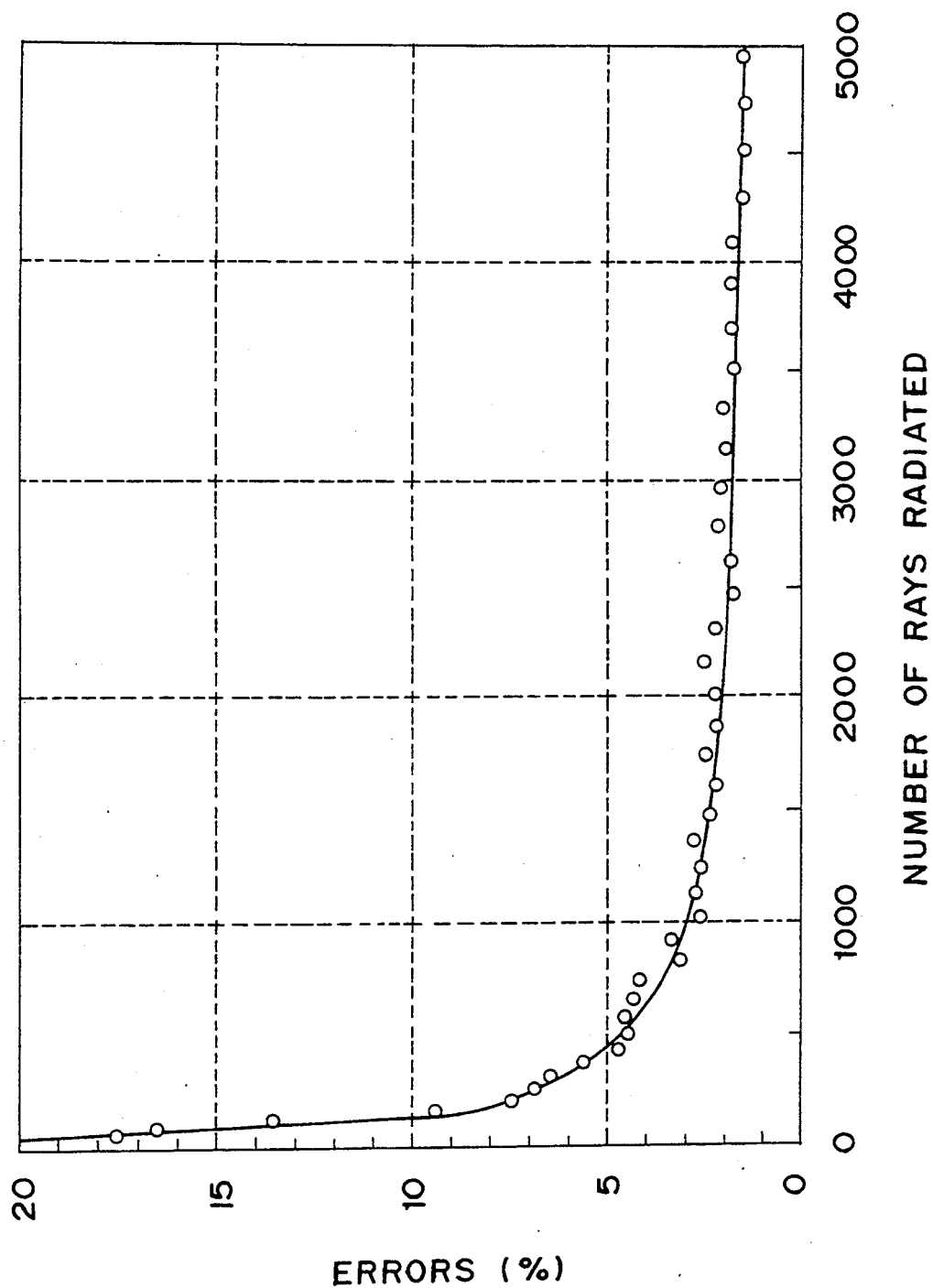
FIG. 13 is a graph indicating the relationship between the number of light rays radiated and errors which would occur in computing the quantity of light received by each surface patch.

As to the radiation on a reflective surface, errors can be reduced by increasing the number of light rays radiated therefrom, as best shown in a graph of FIG. 13. However, the number of light rays radiated from the reflective surface is not necessarily required to be equal to the number of light rays radiated from a light source. For example, when a quantity of light of 2500 lumens and that of 500 lumens are radiated from the light source and the reflective surface, respectively, the quantity of light received by other surface patches can be computed with a reduced accuracy with respect to the light rays radiated from the reflective surface. In other words, the number of light rays radiated from the reflective surface may be less than that of light rays radiated from the light source. By doing so, the time required for computations can be reduced. The number of light rays to be radiated from each patch is determined based on the relationship between the quantity of light radiated therefrom and the desired accuracy. Preferably, the number of light rays radiated from each patch is reduced with the reduction in the quantity of light radiated therefrom. In this way, the illuminance of all the surface patches and the quantity of light diffused therefrom can be known in the lighting environment shown in FIG. 6.

In the flowchart of FIG. 5, if the quantity of light radiated from each patch is less than the given value, the simulation is terminated.

According to the present invention, a pseudo-space considerably analogous to an actual lighting environment is displayed on the display 113 during the analysis. In other words, the result of the processing executed by the CPU 101 is displayed on the display 113, thus making it easy to analyze any lighting environment.

The search for the surfaces at which each light ray arrives is further discussed with reference to FIGS. 14 to 16 and FIG. 20.

Figure 1:
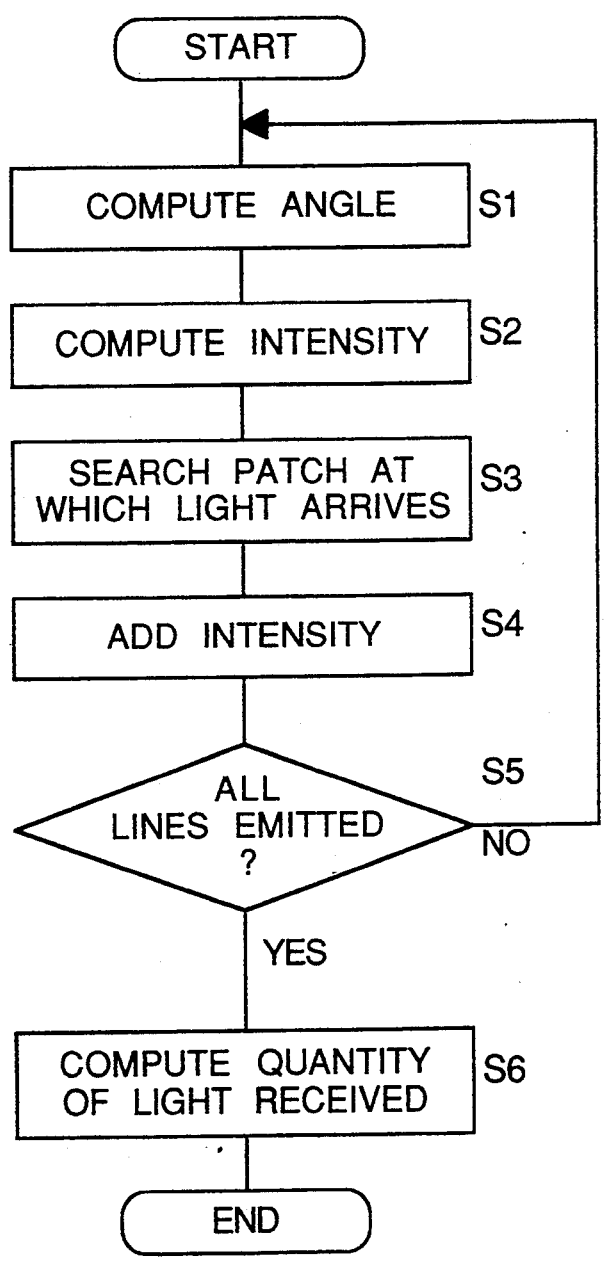
FIG. 1 is a flowchart indicating a conventional method of analyzing a lighting environment.
Figure 2:
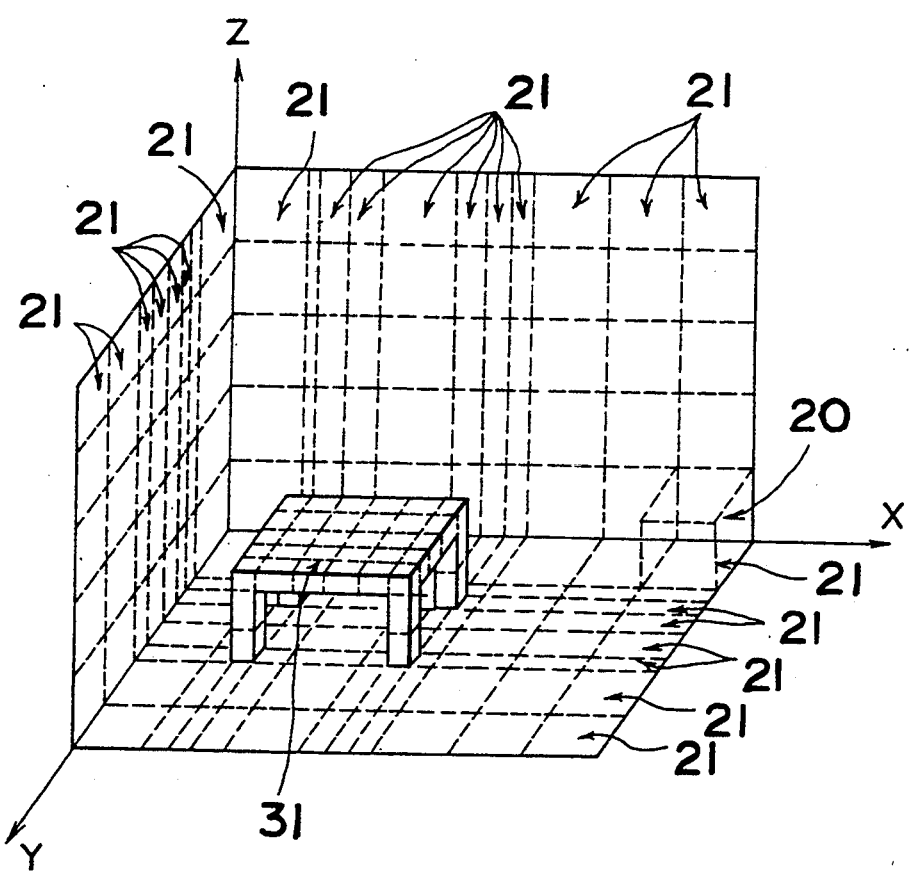
FIG. 2 is a perspective view of tracing blocks and tracing meshes in the case where the lighting environment is divided by the conventional method.
Figure 3:
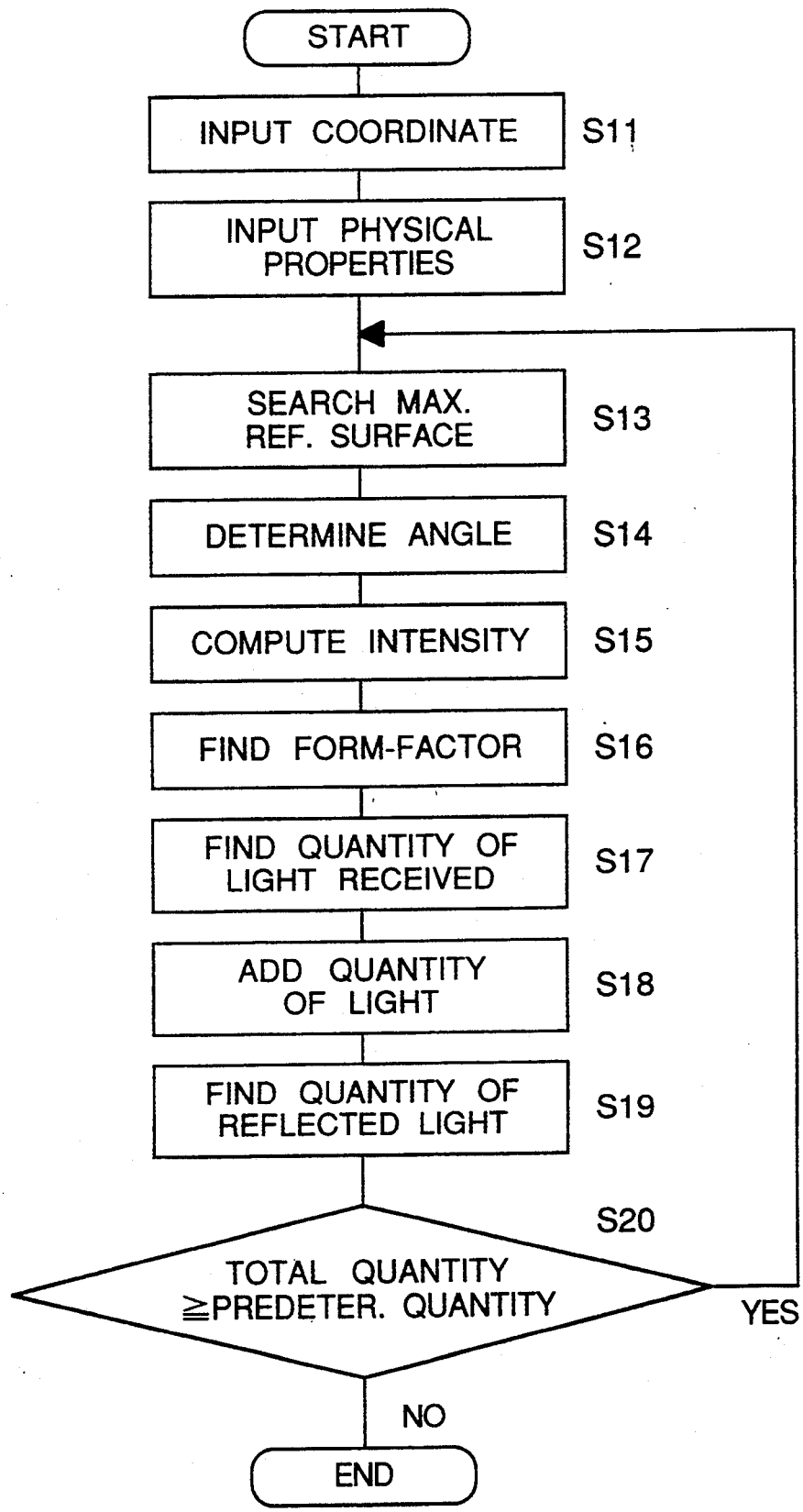
FIG. 3 is a flowchart indicating the detailed procedure of the conventional method.
Figure 4:
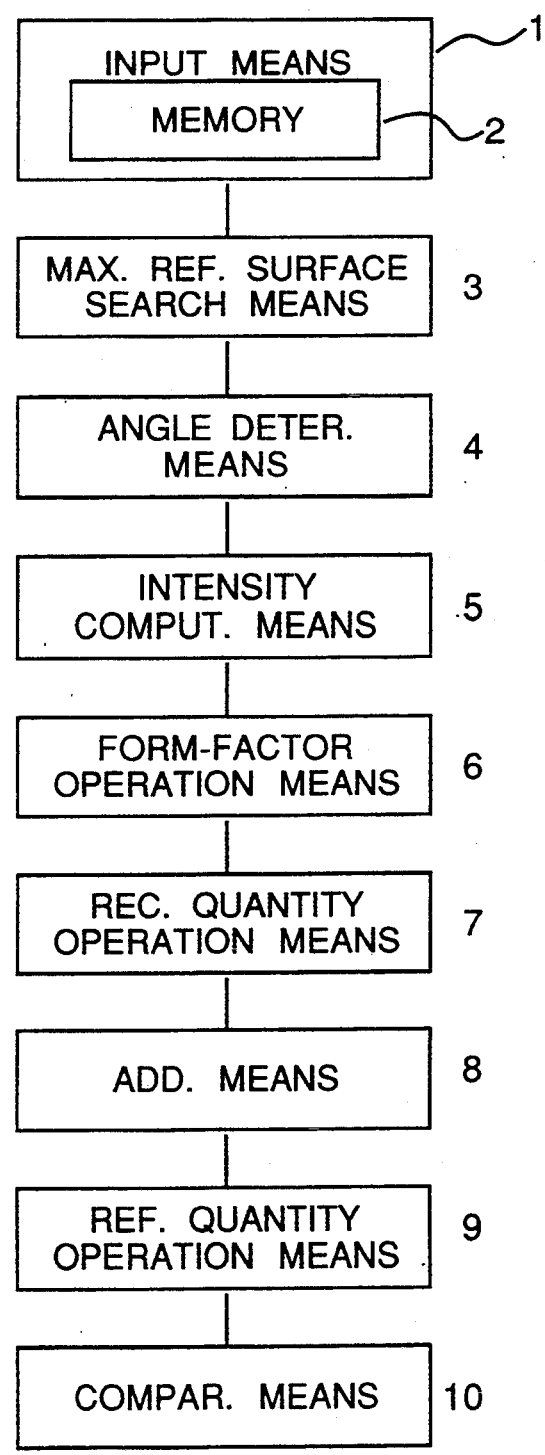
FIG. 4 is a block diagram indicating a conventional apparatus for analyzing a lighting environment.
Figure 16:
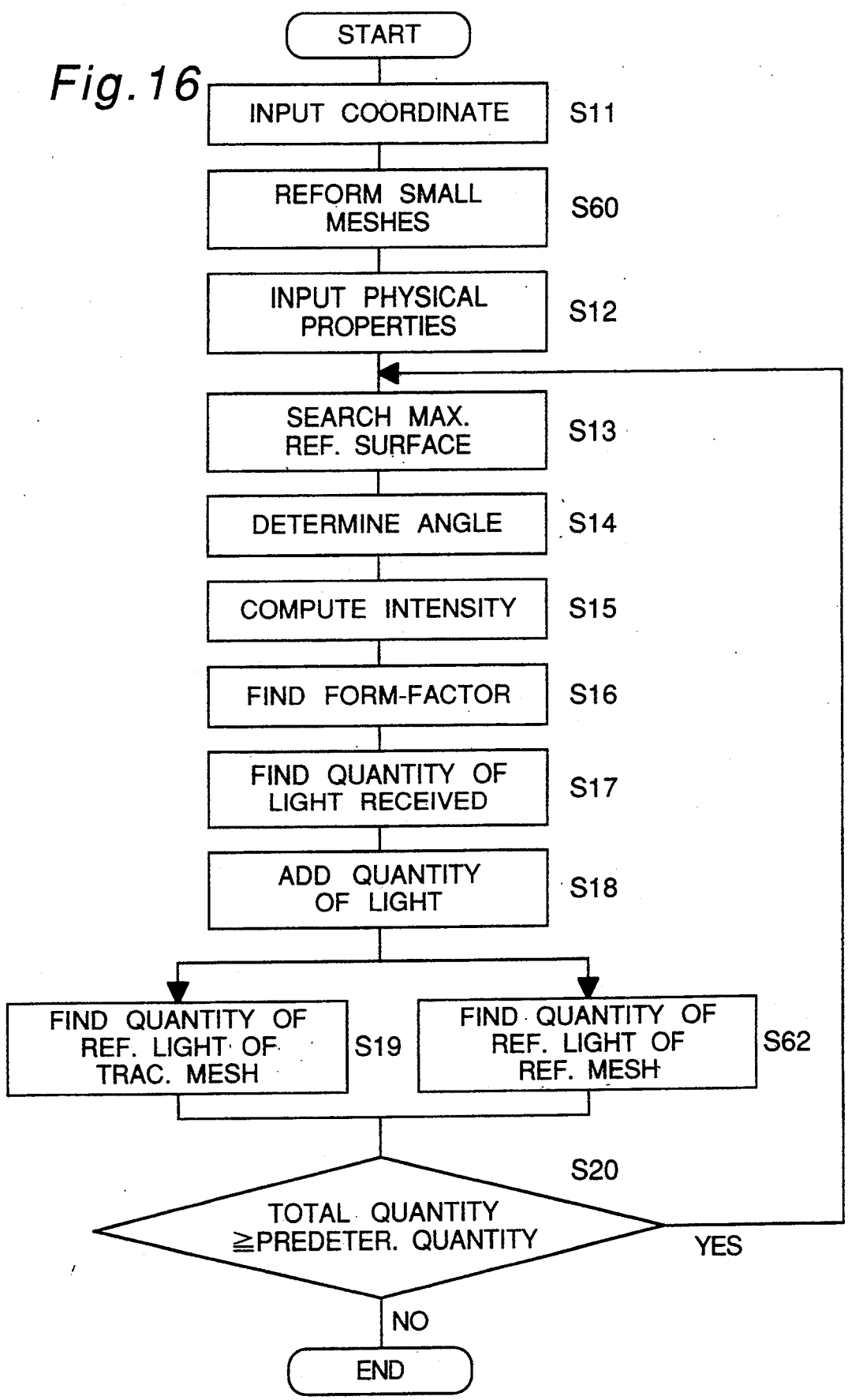
FIG. 16 is a flowchart indicating the detailed procedure of the method according to the present invention.

A flowchart shown in FIG. 16 differs from the flowchart of the conventional case shown in FIG. 3 in that the former includes steps S60 and S62. Step S60 indicates a mesh reformation process and is inserted in between step S11 and step S12. Step S62 indicates a reflected light quantity operation process for each reflective light source and is inserted in between step S18 and step S20 in parallel with step S19.

Figure 20:
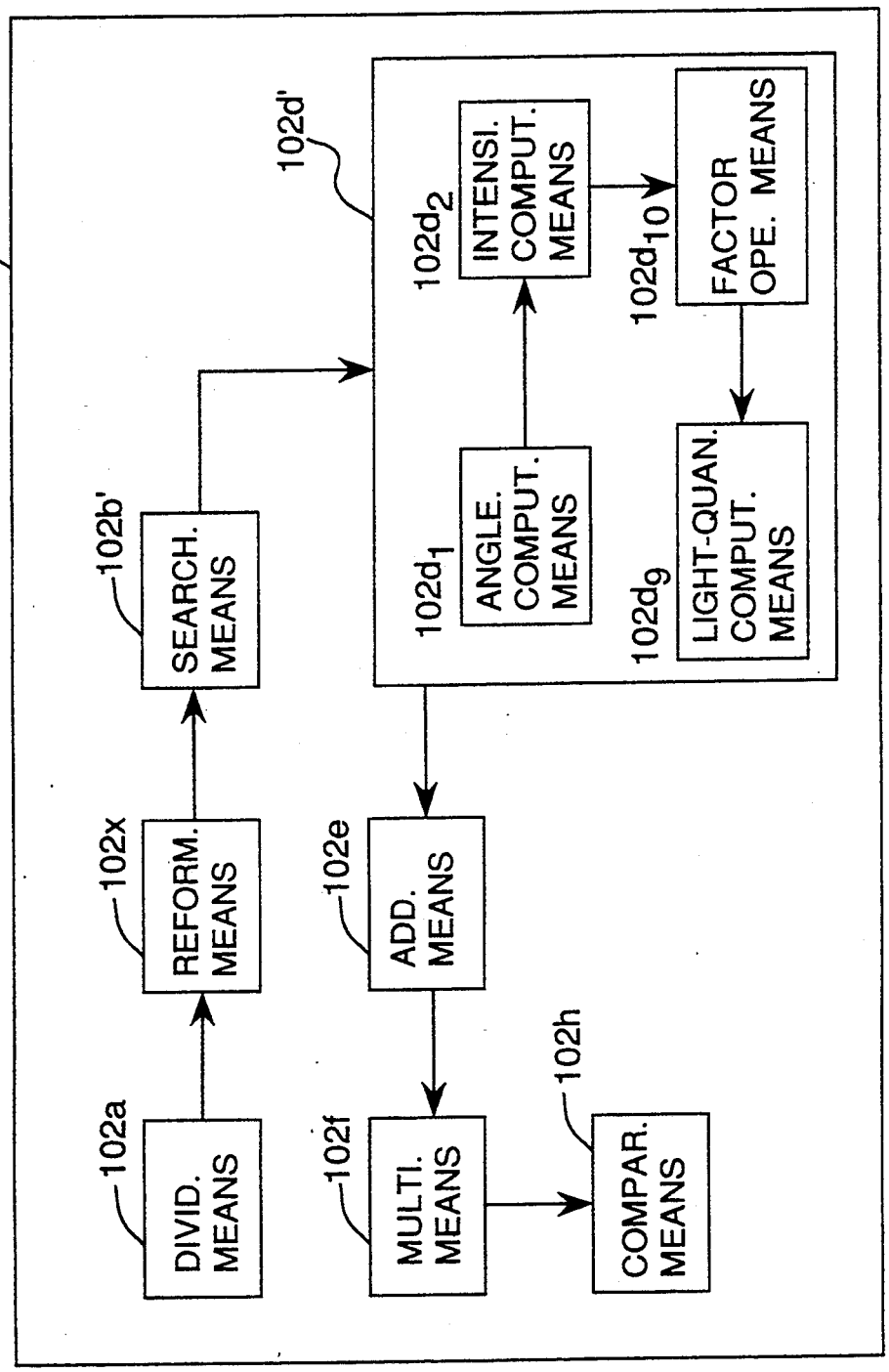
FIG. 20 is a block diagram indicating a modification of the operation unit shown in FIG. 17.

FIG. 20 depicts a modification 102′ of the operation unit 102 shown in FIG. 17.

Figure 14:
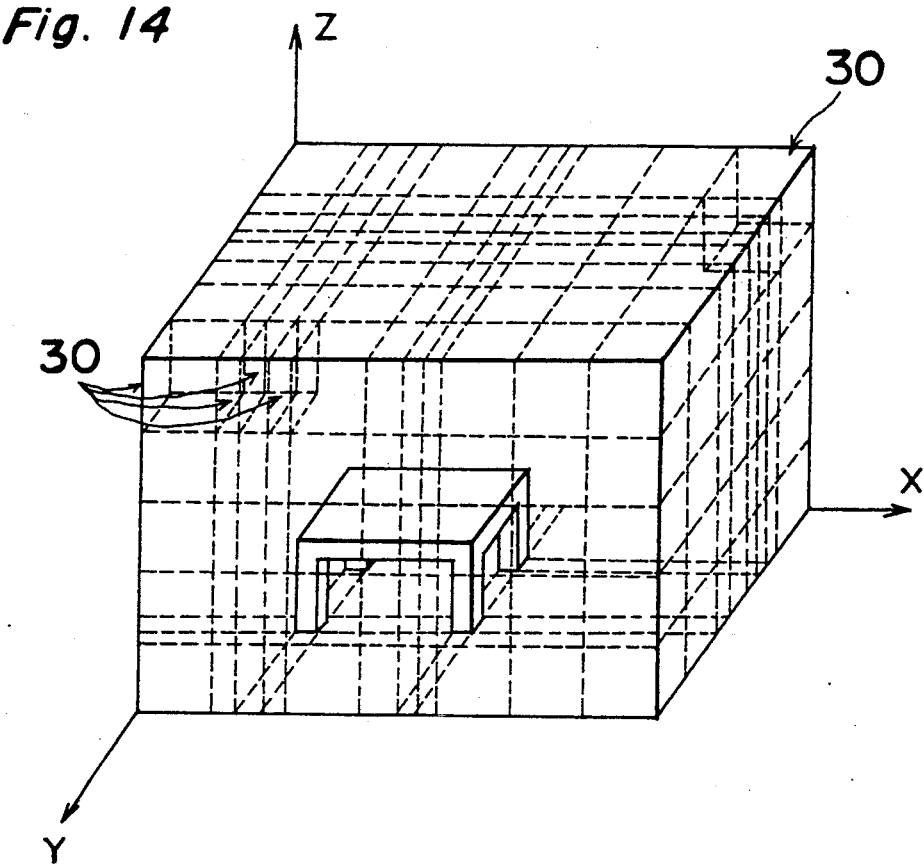
FIG. 14 is a schematic perspective view of a lighting environment to which the present invention is applied.
Figure 15:
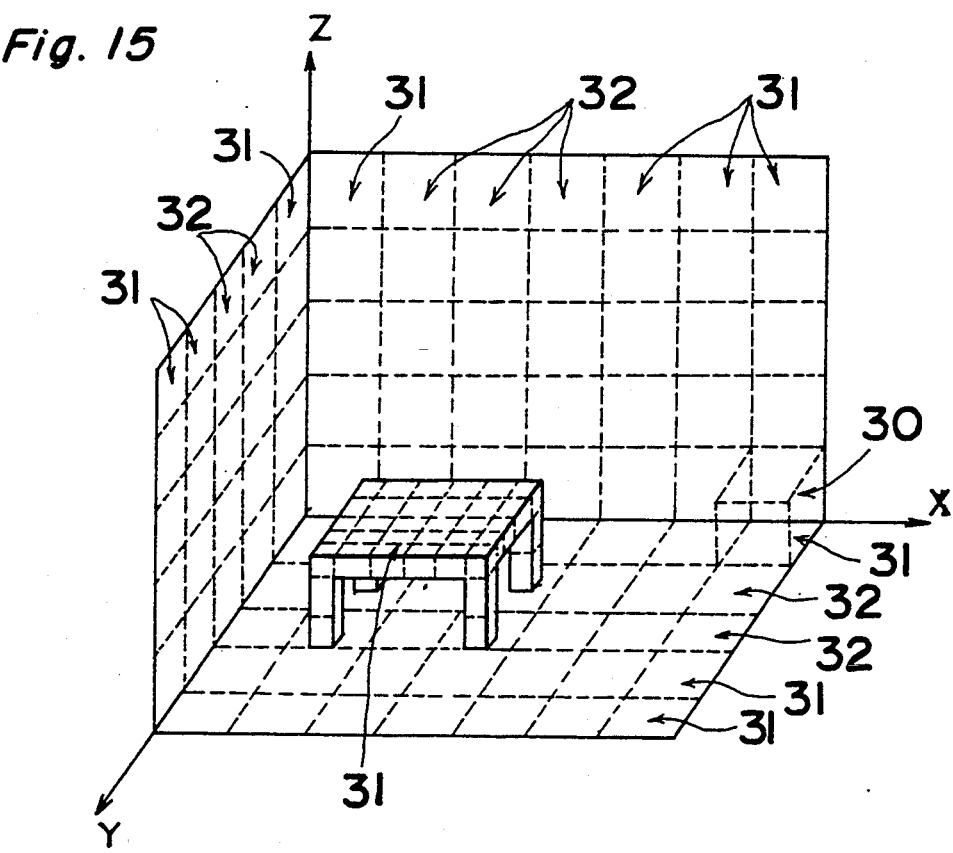
FIG. 15 is a schematic perspective view of tracing blocks and tracing meshes in the lighting environment of FIG. 14.

Step S11 is a tracing block and mesh coordinate input process wherein the entire internal space defined in a room or lighting environmental space to be analyzed are initially divided into a plurality of tracing blocks or hemi-cubes by a plurality of X-Y, Y-Z, and Z-X planes crossing at right angles so that a computer can readily trace trails of light rays reflecting in the room. The processing of step S11 is executed by a dividing means 102$a$. In FIGS. 14 and 15, reference numeral 30 denotes one of the tracing blocks. In this process, coordinates of all the X-Y, Y-Z, and Z-X planes are inputted into the space data storage portion 105$a$ using the keyboard 110. The X-Y, Y-Z, and Z-X planes finely divide the surface of all objects such as walls, floors, ceilings, furnitures, and any other household stuffs constituting the entire internal surface of the room into a plurality of tracing meshes each having an arbitrary rectangular configuration. At this moment, some of the tracing meshes take the form of small or flat rectangles due to the presence of the furnitures or other household stuffs, as shown in FIG. 14.

In FIG. 15, reference numerals 31 denote the tracing meshes. Then, the tracing blocks 30 and the tracing meshes 31 are stored in the space data storage portion 105$a$. Thereafter, the procedure proceeds to step S60.

Step S60 is a mesh reformation process wherein a mesh reforming means 102$x$ combines and/or divides smaller ones and flat ones among the tracing meshes 31 except those of the furnitures or other household stuffs, thereby reforming them into meshes having an aspect ratio closer to one and greater dimensions. In FIG. 15, reference numerals 32 denote such meshes which are subsequently regarded as containing a light source and from which reflected light is radiated. These meshes are hereinafter referred to as reflective meshes. The reflective meshes 32 are stored in the space data storage portion 105$a$.

Step S12 is a physical property input process wherein, for each tracing mesh 31 obtained at step S11 and each reflective mesh 32 obtained at step S60, the physical properties associated with light reception and reflection of an object having the tracing mesh 31 or the reflective mesh 32 are inputted, via the keyboard 110, into and stored in the physical data storage portion 105$b$.

Step S13 is a maximum reflective surface searching process wherein a maximum reflective surface searching means 102$b'$ searches the tracing mesh 31 or the reflective mesh 32 having the maximum quantity of reflected light from among all the tracing meshes 31 obtained at step S11 and the reflective meshes 32. As a matter of course, the target mesh is a tracing mesh containing a light source at first or a tracing mesh 31 or reflective mesh 32 of which the product of the total quantity of light received thereby and the reflectance thereof is maximum at the time light radiated from the light source is being reflected. The maximum reflective surface searching means 102$b'$ corresponds to the maximum radiation searching means 102$b$ shown in FIG. 17. After the search operation completes, the procedure proceeds to step S14.

Step S14 is a light ray radiation angle determining process wherein the radiation angles of a plurality of light rays radiated from the tracing mesh 31 or the reflective mesh 32 searched at step S13 are determined according to the quantity of light thereof. When the tracing mesh 31 contains a light source, the radiation angles are determined based on the luminous intensity distribution standards. On the other hand, when the tracing mesh 31 or the reflective mesh 32 contains no light source, the radiation angles are determined so that light rays may be reflected uniformly in all directions. Step S15 is a luminous intensity computing process wherein the luminous intensity of radiated light is computed according to the direction of radiation. When the tracing mesh 31 having the maximum quantity of reflected light contains the light source, the luminous intensity of radiated light is computed based on the luminous intensity distribution standards. When the tracing mesh 31 or the reflective mesh 32 contains no light source, the luminous intensity of radiated light is computed so that the reflection angles may follow Lambert's cosine law.

Step S16 is a form-factor operation process for each tracing mesh 31 or reflective mesh 32 wherein, when a plurality of light rays having respective radiation angles obtained at step S14 and respective luminous intensities obtained at step S15 are radiated from the tracing mesh 31 or the reflective mesh 32 which has the maximum quantity of reflected light and has been searched at step S13, a formfactor operation means $102d_{10}$ searches a receiving tracing mesh 31 or reflective mesh 32 at which each light ray arrives successively through the tracing blocks 30 obtained at step S11 and computes the quantity of light received thereby. Also, the form-factor operation means $102d_{10}$ executes operations to obtain the ratio between the sum of the quantity of light received by each tracing mesh 31 or reflective mesh 32 and the total sum of the quantity of light received by all the tracing meshes 31 or reflective meshes 32. This ratio is a form-factor for each tracing mesh 31 or reflective mesh 32. In this case, the light arriving at each reflective mesh 32 is computed as the quantity of light arriving at the tracing mesh 31 constituting the reflective mesh 32.

The processing of step S14 and that of step S15 are executed by a radiation-angle computing means $102d_1$ and a luminous-intensity computing means $102d_2$, respectively. The form-factor operation means $102d_{10}$ corresponds to the surface patch searching means $102d_3$, adding means $102d_4$, surface determining means $102d_5$, multiplying means $102d_6$, reflection angle computing means $102d_7$, and number-of-rays comparing means $102d_8$, all of which are shown in FIG. 18.

Step S17 is a received light quantity operation process wherein a light quantity computing means $102d_9$ computes the quantity of light received by each tracing mesh 31 or reflective mesh 32 based on the quantity of reflected light of the tracing mesh 31 or reflective mesh 32 having the maximum quantity of reflected light and the form factor of each tracing mesh 31 or reflective mesh 32.

Step S18 is an adding process wherein an adding means $102e$ cumulatively adds the quantity of light received by each tracing mesh 31 or reflective mesh 32 which has been obtained at step S17. Thereafter, the procedure proceeds to steps S19 and S62.

Step S19 is a reflected light quantity operation process wherein the quantity of reflected light of each tracing mesh 31 is computed based on the cumulative quantity of light received thereby and the reflectance thereof. Step S62 is a reflected light quantity operation process for each reflective mesh 32 wherein the quantity of reflected light of each reflective mesh 32 is computed based on the cumulative quantity of light received thereby and the reflectance thereof. The processing of step S19 and that of step S62 are both executed by a multiplying means $102f$.

Step S20 is a judging process wherein a comparing means $102h$ compares the total sum of the quantity of reflected light of all the tracing meshes 31 and the reflective meshes 32 at that time with a predetermined quantity of light stored in the main storage 109 (normally about 5% of the total quantity of light radiated from the light source). When the total sum is not less than the predetermined quantity of light, the procedure returns to step S13. In contrast, when the former is less than the latter, the operations end.

The conventional method and apparatus require a comparatively long time for operations due to the presence of small tracing meshes, thus resulting in lack of practicability. Furthermore, the presence of flat tracing meshes having a large aspect ratio causes large operation errors.

According to the present invention, however, small or flat tracing meshes among all the tracing meshes are combined and/or divided into reflective meshes each having an aspect ratio closer to one and greater dimensions, thereby reducing the number of meshes and correcting the configuration thereof. By doing so, the following effects are obtained.

(i) The reduction in the number of meshes shortens the time required for operations to assure an enhanced practicability as compared with the conventional technique.

(ii) The corrected configuration of the meshes eliminates errors which may occur in operations required to obtain the quantity of reflected light and the quantity of light received, thereby achieving a lighting environmental analysis with higher accuracy.

Furthermore, because mirror reflection is taken into account in the analysis of the lighting environment, the present invention is useful for developing or designing lighting fixtures.

In addition, because the number of light rays to be radiated from each surface patch is determined according to the quantity of light radiated therefrom, the time required for operations can be shortened with the accuracy of the analysis maintained.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of analyzing a lighting environment by use of an analyzer which comprises a keyboard, a main storage for receiving data inputted from the keyboard, a storage unit for storing the data inputted from the keyboard, a CPU for executing processing required to analyze the lighting environment, and a display for displaying the result of the processing executed by the CPU, said method comprising the steps of:

(a) executing in the CPU a first data processing of dividing the lighting environment into a plurality of blocks so as to divide all surfaces defining the lighting environment into a plurality of surface patches;

(b) executing in the CPU a second data processing of searching a first surface patch radiating a most light energy;

(c) executing in the CPU a third data processing of determining whether a quantity of light radiated from the first surface patch exceeds a given value stored in the main storage;

(d) executing in the CPU a fourth data processing of computing the quantity of light radiated from the first surface patch which arrives at each of said plurality of surface patches, said fourth data processing comprising the steps of:

(d1) computing an angle of radiation of a light ray radiated from the first surface patch;

(d2) computing a luminous intensity of the light ray associated with the angle of radiation;

(d3) searching a second surface patch at which the light ray arrives;

(d4) adding the luminous intensity of the light ray at the second surface patch; and (d8) determining as to whether the number of light rays radiated from the first surface patch exceeds a given number stored in the main storage, said number of light rays depending on the quantity of light radiated from the first surface patch;

(e) executing in the CPU a fifth data processing of adding the quantity of light which arrives at the second surface patch;

(f) executing in the CPU a sixth data processing of multiplying the quantity of light obtained at step (e) by a diffuse reflectance of the second surface patch;

(g) executing in the CPU a seventh data processing of clearing the quantity of light to be radiated from the first surface patch to zero;

(h) repeatedly executing in the CPU said second through seventh data processings until the quantity of light radiated from the first surface patch fails to exceed the given value.

2. The method according to claim 1 wherein said fourth data processing further comprises the steps of:

(d5) determining as to whether the second surface patch is a mirror surface;

(d6) multiplying, if the second surface patch is a mirror surface, said luminous intensity obtained at step (d4) by a mirror surface reflectance; and (d7) deriving an angle of reflection from an angle of incidence of said light ray relative to said mirror surface.

3. The method according to claim 2 wherein said step (d3) comprises the steps of:

(d31) converting the angle of radiation of the light ray into three-dimensional components in a rectangular coordinate system;

(d32) computing, whenever the light ray arrives at each block, a distance between a point of incidence and a plane of said each block in each of three directions;

(d33) finding a shortest distance from among three distances obtained at step (d32); and (d34) determining whether a plane closest to the point of incidence is a solid surface.

4. The method according to claim 3 wherein said step (d1) comprises the step of:

(d11) dividing an imaginary hemisphere lying over a center of the first surface patch into a plurality of sections having substantially a same area so that a plurality of light rays are radiated from the center in generally equally spaced different directions.

5. A method of analyzing a lighting environment accommodating at least one object, said method being capable of simulating lighting in the lighting environment by tracing trails of light rays from a light source and those of light rays reflected by surfaces defining the lighting environment, said method comprising the steps of:

inputting into a storage means coordinates of a plurality of planes extending in three directions perpendicular to each other using a keyboard;

dividing an entire internal space defined in the lighting environment into a plurality of blocks by said plurality of planes so as to finely divide all surfaces constituting an entire internal surface of the lighting environment into a plurality of first meshes each having an arbitrary rectangular configuration;

combining and/or dividing small meshes and flat meshes among all the first meshes except those of the object so as to reform the small meshes and flat meshes into second meshes having an aspect ratio closer to one and having greater dimensions;

computing a quantity of light received by each of the first and second meshes by tracing the trails of the light rays which pass through the blocks; and computing a quantity of reflected light of each of the first and second meshes in accordance with a quantity of light received thereby.

6. An apparatus for analyzing a lighting environment comprising:

a CPU;

a storage means coupled with said CPU;

a display coupled with said CPU for displaying a pseudo-space generated by said CPU;

a dividing means contained in said CPU for dividing the lighting environment into a plurality of blocks so as to divide all surfaces defining the lighting environment into a plurality of surface patches;

a searching means contained in said CPU for searching a first surface patch radiating a most light energy;

a comparing means contained in said CPU for determining whether a quantity of light radiated from the first surface patch exceeds a given value stored in said storage means; and a radiation computing means contained in said CPU for computing the quantity of light radiated from the first surface patch which arrives at each of the plurality of surface patches, said radiation computing means comprising:

(a) an angle computing means for computing an angle of radiation of each of a plurality of light rays radiated from the first surface patch;

(b) a surface patch searching means for searching a second surface patch at which each light ray arrives;

(c) a surface determining means for determining whether the second surface patch is a mirror surface;

(d) a reflection angle computing means for deriving an angle of reflection from an angle of incidence of a light ray reflected by the mirror surface; and (e) a light quantity computing means for computing a quantity of light which arrives at each of the surface patches, wherein said searching means also searches a surface patch at which the light ray reflected by said mirror surface arrives.

7. An apparatus for analyzing a lighting environment comprising:

a CPU;

a storage means coupled with said CPU;

a display coupled with said CPU for displaying a pseudo-space generated by said CU;

a dividing means contained in said CPU for dividing the lighting environment into a plurality of blocks so as to divide all surfaces defining the lighting environment into a plurality of surface patches;

a searching means contained in said CPU for searching a first surface patch radiating a most light energy;

a comparing means contained in said CPU for determining whether a quantity of light radiated from the first surface patch exceeds a given value stored in said storage means; and a radiation computing means for computing the quantity of light radiated from the first surface patch which arrives at each of the plurality of surface patches, said radiation computing means comprising:

an angle computing means for computing an angle of radiation of each of a predetermined number of light rays radiated from the first surface patch;

a surface patch searching means for searching a second surface patch at which each light ray arrives;

a comparing means for determining said predetermined number of light rays according to the quantity of light radiated from the first surface patch; and a light-quantity computing means for computing a quantity of light which arrives at each of the surface patches.

8. An apparatus for analyzing a lighting environment accommodating at least one object, said apparatus being capable of simulating lighting in the lighting environment by tracing trails of light rays from a light source and those of light rays reflected by surfaces defining the lighting environment, said apparatus comprising:

a CPU;

a keyboard coupled with said CPU for inputting into said CPU coordinates of a plurality of planes extending in three directions perpendicular to each other;

a display coupled with said CPU for displaying a pseudo-space generated by said CPU;

a dividing means contained in said CPU for dividing an entire internal space defined in the lighting environment into a plurality of blocks by the plurality of planes, so as to finely divide all surfaces constituting an entire internal surface of the lighting environment into a plurality of first meshes each having an arbitrary rectangular configuration;

a mesh reforming means contained in said CPU for combining and/or dividing small meshes and flat meshes among all the first meshes except those of the object, so as to reform the small meshes and flat meshes into second meshes having an aspect ratio closer to one and greater dimensions;

a light-quantity computing means contained in said CPU for computing a quantity of light received by each of the first and second meshes by tracing the trails of the light rays which pass through the blocks; and a multiplying means contained in said CPU for computing a quantity of reflected light of each of the first and second meshes in accordance with a quantity of light received thereby.

* * * * *

UNITED STATES PATENT AND TRADEMARK OFFICE
CERTIFICATE OF CORRECTION

PATENT NO.   : 5,422,717
DATED        : June 6, 1995
INVENTOR(S)  : Yoshihiro HATTORI et al.

It is certified that error appears in the above-indentified patent and that said Letters Patent is hereby corrected as shown below:

On the cover page, item [30], change the filing date of the Japan application no. 3-253539 to --October 1, 1991--.

Signed and Sealed this

Twenty-sixth Day of September, 1995

Attest:

BRUCE LEHMAN

Attesting Officer    Commissioner of Patents and Trademarks